July 19, 1960

R. L. WATHEN 2,946,050

PULSE RADAR OBJECT DETECTION SYSTEM

Filed Jan. 30, 1946

OPERATION OF CONVENTIONAL RADAR SYSTEM

OPERATION OF THE SYSTEM SHOWN IN FIGS. 1 AND 2

INVENTOR
ROBERT L. WATHEN
BY
ATTORNEY

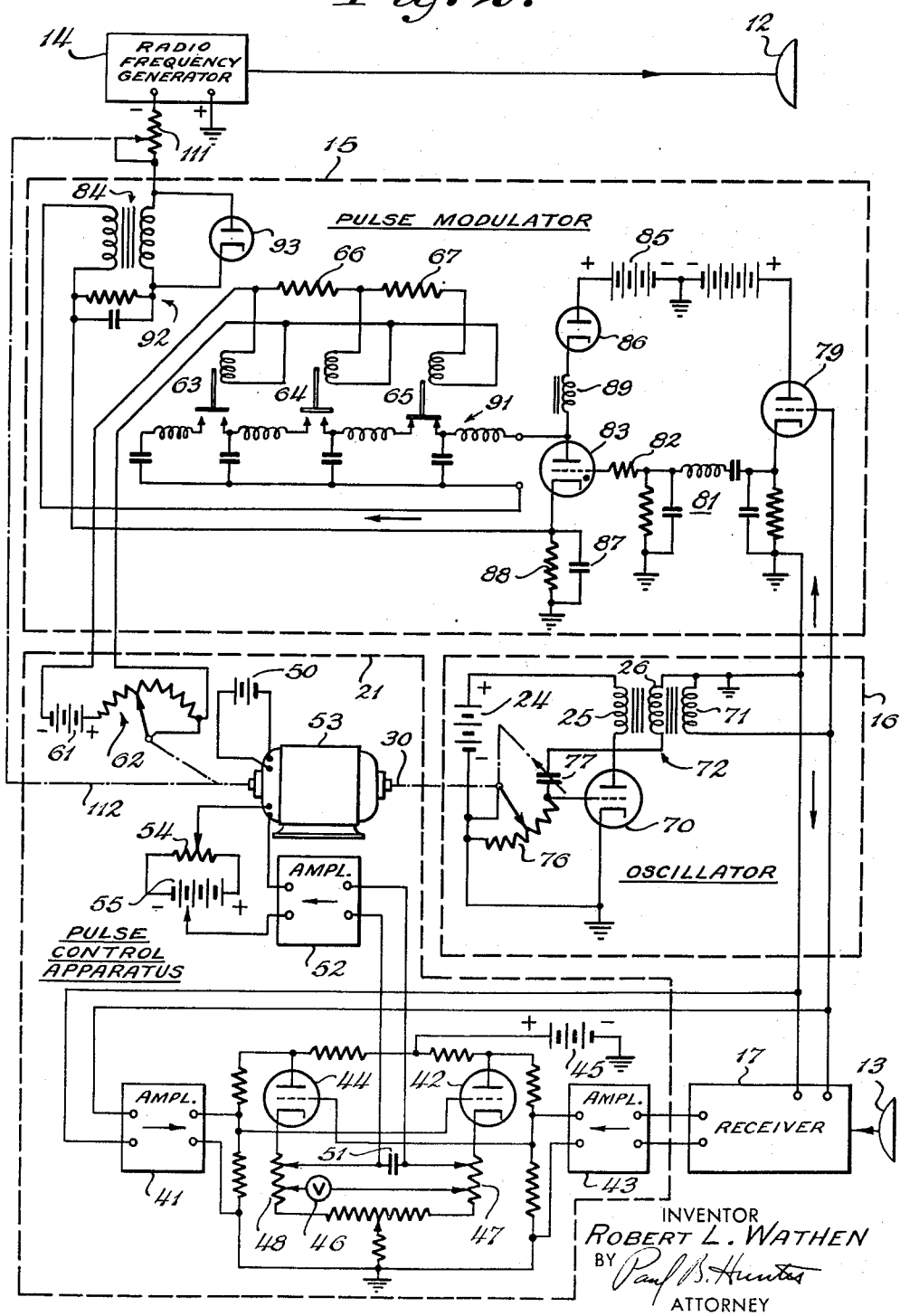

2,946,050

PULSE RADAR OBJECT DETECTION SYSTEM

Robert L. Wathen, Hempstead, N.Y., assignor to Sperry Rand Corporation, a corporation of Delaware Filed Jan. 30, 1946, Ser. No. 644,285

10 Claims. (Cl. 343—13)

The present invention relates to radar systems, and to object detection systems used for range or distance measurement and determination of direction of distant objects.

Radio object detection systems, generally referred to as radar systems, have been devised for determination of object direction and distance by the transmission of recurrent brief impulses of radio energy to a remote object or surface and reception of radio energy impulses reflected from the object or surface. At least one highly directive antenna usually is included in the radar system. Such an antenna may be used in the transmission of impulses or in reception of the reflected radio energy impulses, or a single directive antenna may be employed both in transmission and in reception. The direction of the distant object is determined by observing the variation of the reflected energy intensity according to variation of the direction of aiming of the directive antenna. The distance of the remote object is determined by measurement of the time delay between transmission of an impulse toward the object and the reception of the corresponding reflected energy impulse.

If the radar antenna system is aimed toward an object at a short distance, a relatively short time will be required for the radio energy to traverse the space to the object and return, energizing the receiver. The reflected energy impulses received under such conditions are of high intensity, so that the receiver is required to be adjusted to a condition of very low sensitivity for utilization thereof. For extremely short object distance, it is necessary that the transmitted impulses be of extremely short duration, in order that a transmitted impulse will be terminated before the commencement of reception of the corresponding reflected energy impulse. For distance measurements of the order of 1000 feet, for example, the impulse duration must be appreciably shorter than 2 microseconds, in order to prevent a time-overlapping relation between transmission of an impulse and the interception of a corresponding reflected energy impulse by the receiving antenna.

On the other hand, when the radar antenna system is directed toward a very distant object, extremely weak reflected energy impulses are received therefrom, delayed an appreciable time interval after the corresponding impulse transmission. The receiver sensitivity must be very high and the energy transmitted per impulse must be very great for successful operation with very distant objects.

Heretofore, radar systems have been arranged for transmission of impulses of ultra high frequency energy characterized by a fixed amount of energy per impulse and by fixed impulse duration and repetition rate or recurrence frequency. The repetition rate and the impulse duration have been determined according to the maximum distance at which objects were to be detected. As a result, such systems have usually proved to be handicapped when employed in the determination of distance and direction of objects at extremely short distances, e.g., at distances shorter than one mile.

It is an object of the present invention to provide an improved radar system affording superior performance over a very great range of detected object distances.

Another object is to provide a radar system wherein the characteristics of the current impulse transmission are varied according to object distance, in such a way as to maintain optimum performance through a wide range of distances.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

A feature of the present invention is the variation of the amount of energy transmitted per impulse, as by control of impulse duration, according to the distance of the energy-reflecting object. Also, the repetition rate or recurrence frequency of the impulses may be increased as the energy per impulse is decreased, so that the average transmitted power is not greatly changed.

In accordance with a further feature, there is provided in a radar system apparatus responsive to object distance variations for automatically regulating the characteristics of the recurrent impulse transmission, e.g., for decreasing the duration and increasing the repetition rate or recurrence frequency of the impulses. Such apparatus may be arranged to vary the recurrence frequency in such a way as to maintain a predetermined phase relation between the transmitted impulses and the received signals. At the same time, it may decrease the impulse duration in a predetermined manner as the recurrence frequency increases. As a result, relatively long-duration impulses separated by long intervals are transmitted toward a very distant object, affording sufficient energy per impulse for favorable reflected-energy reception; and very short-duration impulses are transmitted toward a nearby object, safeguarding the radar receiver against high-intensity signal overloading, and providing greatly increased sharpness of object distance indication.

The above objects and features of the present invention will be more fully understood and other features will become apparent from the following detailed description, taken in conjunction with the drawings, wherein:

Fig. 2 is a circuit diagram showing details of the present invention;

Figure 3:
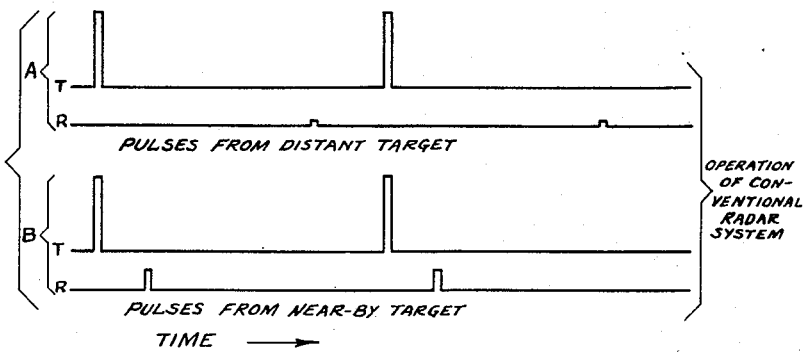
Figure 4:
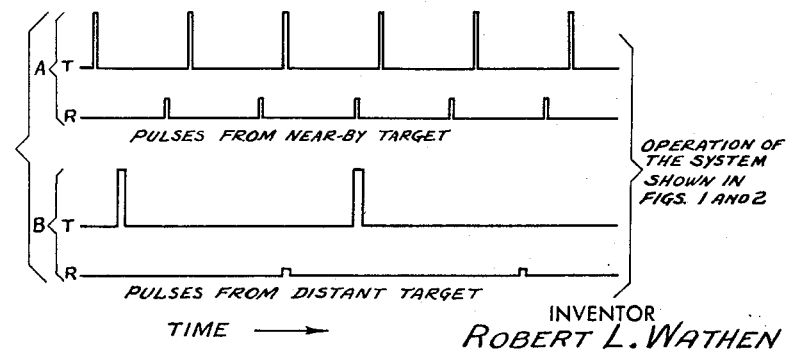

Figs. 3–A and 3–B are diagrams graphically depicting the operation of a conventional radar system characterized by fixed impulse duration and recurrence rate; and Figs. 4–A and 4–B are views illustrating variation of transmitted impulse characteristics according to object distance.

Figure 1:
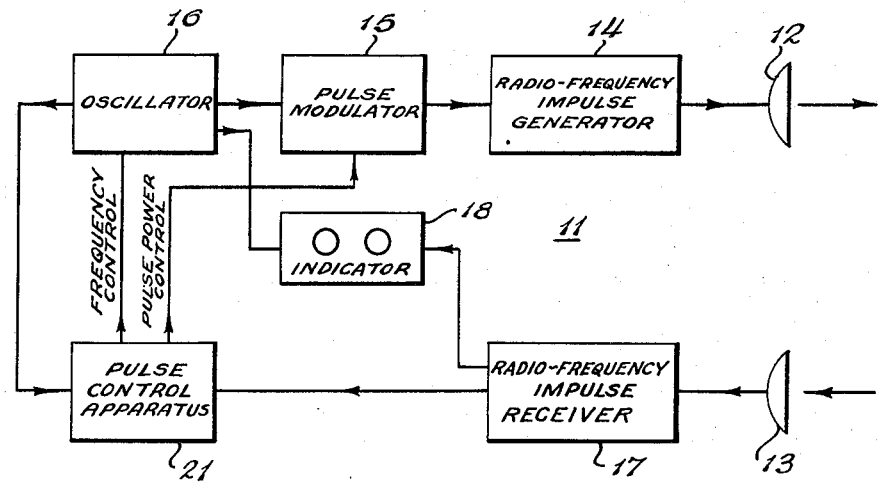
Fig. 1 is a schematic diagram of a radar system embodiment of the present invention.

In Fig. 1 there is shown a radar system 11 including a transmitting antenna 12 and a receiving antenna 13. These antennae may be directional antennae, so that the direction of a distant object may be determined in accordance with the variation of intensity of energy as the direction of aiming of antennae 12 and 13 is varied. Antenna 12 is coupled to a radio frequency generator 14 designed for transmission of relatively brief, extremely high-intensity radio-frequency energy impulses separated by appreciable intervals. Radio frequency generator 14 is energized by unidirectional voltage pulses supplied from a pulse modulator 15, which is synchronized with and controlled by a timing oscillator 16.

A receiver 17 tuned to the radio frequency of the energy supplied by generator 14 is coupled to the directive receiving antenna 13 for amplifying and detecting impulses of radio-frequency energy reflected from a distant object. An indicator apparatus 18 arranged to indicate the time-delay between transmission and reception of corresponding energy impulses is coupled to oscillator 16 and to receiver 17 for receiving output signals therefrom. The indicator 18 may include one or more cathode-ray oscilloscopes arranged for the initiation of a horizontal sweep wave synchronously with the generation of each transmitter impulse, and for providing a vertical deflection or other demarcation of the cathode-ray trace according to detected output pulses supplied by receiver 17. The cathode-ray oscilloscope may be calibrated according to distance. The position of a remote object is determined by reference to the distance indication on the cathode-ray oscilloscope in indicator 18, and by noting the direction of aiming of antennae 12 and 13. If desired, a single directive antenna may be employed instead of antennae 12 and 13 for both transmission and reception.

According to prior practice, oscillator 16 would be arranged to generate pulses at a fixed frequency or repetition rate, and the pulse modulator would be arranged to provide high power pulses of fixed wave shape and pulse duration to the radio frequency generator 14, so that the energy per transmitted impulse and the repetition rate of the transmitted impulses would remain constant, irrespective of the distance of a detected object. In accordance with the present invention, a pulse control apparatus 21 is arranged to control the repetition rate and the duration of the transmitted impulses in accordance with the distance of a detected object. For this purpose, the pulse control apparatus 21 may be coupled to the oscillator 16 and the receiver 17 for obtaining a phase or time-delay comparison between generated impulses and detected impulses, and may be operatively coupled to oscillator 16 and pulse modulator 15 for controlling the frequency of oscillator 16 and for controlling the pulse duration of the pulses supplied by modulator 15 to the radio frequency generator 14.

In one embodiment of the invention, pulse control apparatus 21 is arranged to vary the frequency of oscillator 16 substantially inversely as the distance to the detected object, and to increase the duration of pulses supplied by pulse modulator 15 as the distance to the detected object increases. The interconnections of an illustrative pulse modulator 15, pulse oscillator 16 and receiver unit 17 with an illustrative pulse control apparatus 21 are shown in Fig. 2.

The oscillator 16 comprises a triode 70 having its cathode grounded and its anode supplied by a battery 24 connected through one winding 25 of a 3-winding transformer 72. A secondary winding 26 of the transformer is grounded at one end and connected at its opposite end to a series circuit comprising a capacitor 77 and a resistor 76, each of which may be variable. The resistor 76 is grounded at one end, and the junction of resistor 76 and capacitor 77 is connected to the grid of triode 70. The coupling between winding 25 and winding 26 of transformer 72 serves to induce a regenerative feedback voltage in the grid circuit of the oscillator.

The oscillator 70 generates recurrent brief voltage pulses at a frequency determined by the time constant of the R–C circuit 76, 77.

Transformer 72 is provided with a further secondary winding 71, across which are developed brief recurrent output voltage pulses corresponding to the current pulses through triode 70. This secondary winding is connected to the grid circuit of a triode 79 in the pulse modulator 15. Triode 79 is employed in a cathode follower circuit which is coupled through a coupling network 81 and a series resistor 82 to the control grid of a thyratron 83. The thyratron 83 is provided with a cathode biasing circuit including a capacitor 87 and a resistor 88, and with an anode supply circuit including a voltage source 85, a diode rectifier 86 and an inductor 89. Upon excitation of the cathode follower stage 79 by oscillator 16, this stage supplies an amplified voltage pulse through network 81 and resistor 82 to the grid of thyratron 83, causing the initiation of current flow through thyratron 83, and thereby supplying a voltage discontinuity both to the primary winding of a pulse modulator output transformer 84 and to the input terminals of a delay line 91 connected in series therewith. The current thus commenced through thyratron 83 and the primary winding of transformer 84 continues until the voltage discontinuity applied to the input end of the delay line 91 has been propagated toward the opposite end of the delay line 91 and reflected back to its input terminals. Upon the arrival of the reflected voltage discontinuity at the input terminals of delay line 91, the anode potential of thyratron 83 is abruptly reduced and the anode current therethrough is extinguished, the thyratron 83 being restored to a quiescent condition to await a further grid excitation pulse from oscillator 16 and cathode follower 79.

The time interval of current conduction through thyratron 83, and accordingly, the time interval of energization of transformer 84, is determined by the delay-time characteristic of the artificial transmission line 91, and this delay time is in turn dependent upon the number of sections operatively connected in the delay line 91. The secondary winding of transformer 84 is coupled to the radio frequency generator 14, and so arranged, in conjunction with a resistance-capacitance network 92 and a diode rectifier 93, as to supply to the radio frequency generator 14 relatively sharp unidirectional voltage excitation pulses, which cause the generator 14 to produce correspondingly sharply defined output impulses of radio frequency energy. Apparatus generally of the type described above has been employed heretofore in radar systems, except that it has been conventional practice to employ a delay line 91 of fixed effective length and also to use a fixed R–C network 76, 77 in oscillator 16.

In accordance with the present invention, the output pulses from oscillator 16 are supplied to the input terminals of an amplifier 41, which is arranged to supply output pulses of predetermined strength to the grid circuit of one tube 42 of a time interval-selector means comprising an Eccles-Jordan trigger circuit. The output of the receiver 17 is supplied to the input terminals of another amplifier 43 whose output circuit is connected for energizing the grid circuit of the other tube 44 of the trigger circuit. Tubes 42 and 44 of the Eccles-Jordan circuit are connected in a well-known manner with an anode voltage supply 45 and appropriate anode and grid coupling resistors, in such a way that when anode current is being conducted through a first one of the Eccles-Jordan trigger tubes the grid circuit of the second tube is maintained negatively, biased to an appreciable potential, preventing anode current flow through the second tube. The Eccles-Jordan circuit remains in this condition until the grid of the second tube receives a sufficiently strong grid excitation impulse to initiate anode current conduction therethrough. As a result of the initiation of anode current conduction through the second tube of the Eccles-Jordan circuit, an appreciable negative voltage is applied to the grid of the first tube of the circuit, and the anode current through the first tube is abruptly arrested, leaving only the second tube conducting current. This condition prevails until a further reversal is produced by the application of a grid excitation impulse to the first tube.

In the arrangement shown in Fig. 2, at the commencement of a voltage pulse from oscillator 16, tube 42 of the Eccles-Jordan circuit is rendered conductive. Tube 42 remains conductive, and tube 44 remains non-conductive, until a reflected energy impulse is intercepted by antenna 13 and a corresponding voltage pulse is produced at the output terminals of receiver 17. At this time, an excitation pulse is supplied through unit 43 to the grid of tube 44, initiating anode current conduction through tube 44 and arresting the current conduction of tube 42. The next succeeding pulse from oscillator 16 again causes an abrupt shift to conduction through tube 42, and its corresponding reflected energy impulse again shifts the current conduction to tube 44. Tubes 42 and 44 and the resistor networks associated therewith preferably are so arranged that the anode current through tube 44, when conductive, is equal to the anode current through tube 42 when the latter is conductive.

A voltmeter 46 may be connected between adjustable taps on cathode resistors 47 and 48 for indicating a comparison of the average currents through these tubes. If the interval of current conduction through tube 44 is equal to the interval of anode current conduction through tube 42, the average currents flowing through resistors 47 and 48 will be equal. If the intervals of conduction through tube 42 are greater than those of tube 44, a larger average current flow results through resistor 47 than that through resistor 48, and accordingly, the voltmeter 46 will indicate a higher positive potential of the resistor 47 than that of the resistor 48. Conversely, if the conduction intervals are unequal in the opposite sense, the voltage difference across voltmeter 46 will be of the opposite polarity. The phase measuring arrangement including amplifiers 41 and 43, tubes 42 and 44, and indicator 46 corresponds generally to that shown in U.S. Patent 2,370,692 issued March 6, 1945 to J. E. Shepherd.

A capacitor 51 may be connected between suitable taps on resistors 47 and 48, for providing a filtered direct voltage varying in magnitude and polarity according to the relative lengths of the conduction intervals of tubes 42 and 44. Capacitor 51 is connected to the input terminals of an amplifier 52, whose output circuit is connected to the controlling winding of a reversible servo motor 53, through a circuit including a potentiometer 54 and a voltage source 55 for introducing an adjustable direct bias voltage. Motor 53 may include a permanent magnet field unit, or it may have a field winding supplied by a battery 50. The motor 53 is coupled, as schematically indicated at 30, to the movable arm of variable resistor 76, and also to the control element of variable capacitor 77. Motor 53 is arranged to decrease the capacitance of capacitor 77 and the resistance of resistor 76, decreasing the time constant of the circuit 77, 76, and thus increasing the impulse frequency, as the relative phase delay decreases between the pulses generated by oscillator 16 and the reflected energy impulses detected by receiver 17. Accordingly, motor 53 operates to increase the frequency of oscillator 16 as required to maintain a substantially fixed phase relation between the transmitted energy impulses and the received energy impulses as the distance of a detected object decreases.

Motor 53 is coupled to the delay line 91 for controlling the delay time thereof in such a way as to decrease the transmitted impulse duration in a predetermined relation to the decreasing time constant of the R-C circuit 76, 77 and the resultant increasing frequency of oscillator 16. Accordingly, this servo motor acts to decrease the impulse duration in accordance with the decrease of distance to an energy-reflecting target.

Motor 53 may be coupled to the delay line 91 by means of a voltage control circuit including a source 61 and a motor-driven rheostat 62, arranged to supply a variable voltage to a series of solenoids 63, 64 and 65. Solenoids 63, 64 and 65 may be arranged to be operated at progressively increasing voltages, or similar solenoids may be employed with a series of voltage-dividing resistors 66 and 67 connected intermediate the successive solenoids. This circuit may be so arranged that when motor 53 positions the movable elements of rheostat 76 and capacitor 77 for a very short target distance, and accordingly, for a very high oscillator frequency, the output voltage of the circuit 61, 62 is sufficiently high to energize solenoids 63, 64 and 65, leaving only one inductance-capacitance section connected in delay line 91. Then, as the distance to the target increases and the motor 53 operates to increase the time constant of R-C circuit 76, 77 and decrease the frequency of oscillator 16, the resistance introduced by rheostat 62 is increased, so that the movable contact member of solenoid 65 is dropped into the position for providing operative connection of an additional section of the delay line 91. A still further decrease of oscillator frequency is accompanied by a further reduction of voltage supplied to the solenoids, so that solenoid 64 next releases its contact member, further increasing the delay characteristic of delay line 91, and thus still further increasing the duration of the transmitted energy impulses. Any desired number of section may be arranged in delay line 91 for selective connection thereto, for changing the duration of the transmitted energy impulses in any desired manner.

The operation of the present invention may be better understood by reference to Figs. 3 and 4. Fig. 3-A is a pair of graphs T and R showing the time relation between transmission of successive energy impulses (T) and the reception of very weak, long-delayed impulses (R) from a very distant object. Fig. 3-B similarly shows at T and R the time relation between transmission of successive impulses and the reception from a near-by object of relatively strong reflected energy impulses only slightly delayed relative to the transmitted impulses. Operation such as depicted in Fig. 3, with fixed duration and recurrence frequency of the transmitted impulses, is characteristic of a conventional radar system.

In Fig. 4-A are shown a transmitted energy wave envelope T and a received energy wave envelope R illustrating the relatively high repetition rate and the relatively short-duration impulses characterizing the present invention when an object is detected at a relatively short distance from the radar system. In Fig. 4-B are shown similar graphs T and R of the transmitted energy envelope and the received energy envelope corresponding to the detection of an object at a relatively great distance from the radar system. Comparison of Fig. 4-B with Fig. 4-A shows that the transmitted impulse duration has been increased so that the energy transmitted per impulse is appreciably increased when the radar system is employed in connection with a more distant object. It will be noted, too, that while the pulse repetition rate corresponding to the greater object distance is greatly reduced, the relative phase displacement between the transmitted impulse envelope wave T and the received signal envelope wave R is substantially identical to that represented between wave T and wave R of Fig. 4-A. Fig. 4 thus illustrates the manner in which the phase-sensitive pulse control apparatus is employed for varying the impulse timing oscillator frequency (and hence the impulse repetition rate), and the impulse duration, in predetermined relations to the distance of a detected object, for maintaining the radar system adjusted to optimum operating conditions.

If desired, the amount of radio frequency energy transmitted per impulse may be varied by variation of the radio frequency energy intensity. This may be accomplished either by variably attenuating the energy supplied by generator 14, or by controlling the input voltage supplied to generator 14, as illustrated by the use of a variable resistor 111 (Fig. 2) connected between the pulse modulator 15 and the generator 14, and mechanically coupled to motor 53 as schematically indicated at 112. Such control of the transmitted radio frequency impulse intensity by motor 53, operated in accordance with the object distance, may be employed along with the control of transmitted impulse duration, as an adjunct thereto, or it may be used alone for variation of the energy transmitted per impulse according to the distance of the object. If desired, the transmitted signal intensity and duration may be reduced together as the object distance decreases.

The radar system shown in Figs. 1 and 2 and embodying the present invention may be used either for searching over a broad angular range for any object, such as an aircraft, a ship, a tank, a submarine or a projectile, or for "tracking" the movement of a selected object. For example, the invention may be embodied in a radar system employed in an aircraft flying over an expanse of ocean in search of a vessel. It is also useful in a radar system wherein the directive antenna or antennae are maintained directed generally toward an object, the general aiming of the antenna system being varied as the direction of the object varies, as indicated by minute variations of the strength of the received signals produced by energy reflected from the object.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Radar object detection apparatus comprising means for recurrently transmitting a series of short impulses of radio energy separated by relatively long intervals between successive impulses, means for receiving radio energy impulses reflected from the object, said transmitting means being operative independently of said receiving means, the time delay between transmission of an impulse and reception of the corresponding reflected energy impulse being a measure of the distance to the object, and means coupled to said transmitting means and to said receiving means and responsive to variation of the elapsed time between transmission of an impulse and reception of the corresponding reflected energy impulse for simultaneously increasing the repetition rate and reducing the energy transmitted per impulse as said elapsed time decreases, whereby weaker impulses are transmitted at a greater repetition rate as the distance to a detected object decreases.

2. Radar object detection apparatus as defined in claim 1, further including phase responsive means coupled to said transmitting means and said receiving means for indicating the distance of a detected object from said transmitting and receiving means.

3. Radar object detection apparatus as defined in claim 1, wherein said means for simultaneously increasing the repetition rate and reducing the energy transmitted per impulse includes impulse recurrence rate comtrol means coupled to said transmitting means for variation of the recurrence rate of said impulses, and impulse energy control means coupled to said transmitting means for variation of the energy transmitted per impulse, said impulse energy control means being coupled to said impulse recurrence control means for varying the energy per impulse in a predetermined relation to the impulse recurrence rate.

4. Radar object detection apparatus comprising recurrent pulse generating means for transmitting to an object a series of short impulses of radio energy at a repetition rate characterized by relatively long intervals between successive impulses, means for receiving radio energy impulses reflected from the object, said pulse generating means being operative to produce output pulses in the absence of received pulses, said received radio energy impulses being delayed by a time interval proportional to the distance to said object, means coupled to said transmitting and receiving means and responsive to said time delay for indicating the distance to said object, and means coupled to said transmitting means and to said receiving means and responsive to variation of the average delay between transmission of an impulse and reception of the corresponding impulse for varying the relative duration of said transmitted impulses and the intervals therebetween in accordance with the distance to said object, said last defined means comprising means for simultaneously decreasing impulse duration as said impulse repetition rate is increased, and simultaneously increasing impulse duration as said impulse repetition rate is decreased.

5. Radar object detection apparatus as defined in claim 4, wherein the last defined means includes impulse recurrence control means coupled to said transmitting means for increasing the repetition rate as the distance to said object decreases and decreasing the repetition rate as said distance increases, impulse duration control means coupled to said transmitting means for increasing the impulse duration as said distance increases and decreasing the impulse duration as said distance decreases, and means coupled to said impulse duration control means and said impulse recurrence control means for maintaining a predetermined relation between impulse duration and recurrence rate.

6. Radar object detection apparatus comprising means independent of received energy for recurrently transmitting to an object a series of short impulses of radio energy at a predetermined repetition rate characterized by relatively long intervals between successive impulses, means for receiving radio energy impulses reflected from the object, said received impulses being delayed relative to said transmitted impulses by a time delay proportional to the distance to the object, means coupled to said transmitted means and to said receiving means and responsive to the time delay between transmission and reception of corresponding impulses for indicating the distance to said object, and means coupled to said transmitting means and to said receiving means and responsive to variation of the time delay between transmission and reception of corresponding impulses for increasing the energy in each transmitted impulse as the distance to said object increases, and reducing the energy transmitted per impulse as the distance to said object decreases, the means for increasing or decreasing the energy in said transmitted impulses comprising apparatus for controlling the duration of said transmitted impulses.

7. Radar apparatus, comprising a radar transmitter for transmitting recurrent radio frequency impulses of variable energy per impulse, a radar receiver for receiving radio frequency impulses reflected from an object, a phase comparator coupled between said radar transmitter and said radar receiver and responsive to electrical energy output from said receiver and said transmitter for producing an output control voltage varying as the phase relation between transmitted impulses and the output of said receiver, and means responsive to the output control voltage of said phase comparator and operatively coupled to said radar transmitter for automatically and gradually regulating the duration of said transmitted impulses in response to the phase difference between said transmitted impulses and the output of said receiver, said last-named means comprising means for producing a continual increase in the duration of said transmitted impulses in accordance with a continual increase in said phase difference and a continual decrease in the duration of said transmitted impulses in accordance with a continual decrease in said phase difference.

8. Radar apparatus, comprising a controllable recurrent pulse radar transmitter for transmitting recurrent radio frequency energy impulses of variable intensity and duration, a radar receiver for responding to impulses of energy of said radio frequency reflected from an object, and transmitter control means responsive to electrical outputs from said transmitter and receiver and coupled to said transmitter for smoothly varying the impulse duration and energy intensity automatically in accordance with variation of the time delay interval between impulse transmission and reflected impulse reception, said transmitter control means coordinately and continuously increasing impulse duration and impulse intensity over a wide range of time delay intervals as the time delay interval between transmitted and received impulses increases, and coordinately and continuously decreasing impulse duration and impulse intensity over said range of time delay intervals as the time delay interval between transmitted and received impulses decreases.

9. Apparatus as defined in claim 8, wherein said transmitter control means comprises phase comparator means for producing an output voltage varying according to the phase relation between the transmitted impulses and the output of said radar receiver, and means responsive to said output voltage of said phase comparator means for automatically varying the recurrence frequency of said transmitter to continually suppress variations in said phase relation and for varying the transmitter impulse duration and energy intensity in a predetermined relation with the impulse recurrence frequency.

10. A radar object detection system, comprising means for transmitting a series of short impulses of radio energy to an object, means for receiving radio energy impulses reflected from the object, the received impulses being delayed to an extent substantially proportional to the distance to the object, said transmitting means comprising means for transmitting said impulses at a variable repetition rate characterized by relatively long time intervals between successive impulses in the absence of energy reflected from an object, time interval-selector means energized by said transmitting means and said receiving means for producing a control voltage which is variable in magnitude according to the difference between the duration of one-half the period of said transmitted impulses and the average elapsed time between transmission of impulses and reception of the corresponding reflected energy impulses, and transmitter impulse control means responsive to said variable control voltage for automatically and continuously increasing the repetition rate of impulse transmission as the distance to said object decreases, and simultaneously reducing the energy transmitted per impulse as said repeition rate is increased.

References Cited in the file of this patent

UNITED STATES PATENTS

| | | |
|---|---|---|
| 1,945,592 | Nicolson | Feb. 6, 1934 |
| 2,181,568 | Kotowski | Nov. 28, 1939 |
| 2,333,688 | Shepard | Nov. 9, 1943 |
| 2,404,527 | Potapenko | July 23, 1946 |
| 2,415,855 | Skellett | Feb. 18, 1947 |
| 2,419,541 | De Rosa | Apr. 29, 1947 |
| 2,422,382 | Winchel | June 17, 1947 |
| 2,423,024 | Hershberger | June 24, 1947 |
| 2,423,082 | Busignies | July 1, 1947 |
| 2,425,600 | Coykendall | Aug. 12, 1947 |
| 2,428,424 | Landon | Oct. 7, 1947 |
| 2,428,799 | Hayes | Oct. 14, 1947 |
| 2,431,344 | Reeves | Nov. 25, 1947 |
| 2,454,772 | Chatterjea | Nov. 30, 1948 |
| 2,530,418 | Alvarez | Nov. 21, 1950 |
| 2,542,983 | Beatty | Feb. 27, 1951 |
| 2,568,441 | Fyler | Sept. 18, 1951 |

FOREIGN PATENTS

| | | |
|---|---|---|
| 813,404 | France | June 1, 1937 |
| 897,437 | France | Mar. 21, 1945 |